United States Patent [19]

Wroblewski

[11] Patent Number: 4,908,822

[45] Date of Patent: * Mar. 13, 1990

[54] ELECTRICAL DEVICES COMMAND SYSTEM, SINGLE WIRE BUS AND SMART DUAL CONTROLLER ARRANGEMENT THEREFOR

[75] Inventor: Thomas R. Wroblewski, Sterling Heights, Mich.

[73] Assignee: Chrysler Motors Corporation, Highland Park, Mich.

[*] Notice: The portion of the term of this patent subsequent to Mar. 6, 2007 has been disclaimed.

[21] Appl. No.: 280,916

[22] Filed: Dec. 7, 1988

[51] Int. Cl.[4] ............................................. H04J 3/26
[52] U.S. Cl. ..................................... 370/85; 370/24; 370/94
[58] Field of Search ................. 370/85, 94, 89, 96, 370/90, 24; 340/825.5, 825.51, 825.52, 425.5

[56] References Cited

U.S. PATENT DOCUMENTS

| | | | |
|---|---|---|---|
| 4,715,031 | 12/1987 | Crawford et al. | 370/85 |
| 4,736,367 | 4/1988 | Wroblewski et al. | 370/85 |
| 4,740,952 | 4/1988 | Vernieres et al. | 370/24 |
| 4,809,266 | 2/1989 | Okada | 370/85 |
| 4,821,262 | 4/1989 | Futami | 370/85 |

Primary Examiner—Douglas W. Olms
Attorney, Agent, or Firm—Wendell K. Fredericks

[57] ABSTRACT

A multiplex system for addressing, commanding and monitoring the status of a plurality of electrical devices disposed throughout a motor vehicle. A dual-duty cycle type voltage waveform generated by a microcomputer provides a series of address information signals for enabling individual dual controllers connected to a bi-directional single wire bus coupled at one end to a driver and receiver circuit of the microcomputer. After the individual dual controller is addressed, another portion of the waveform enable the addressed controller to use a voltage signal to operate one of the connected pair of elements. Then, another portion of the waveform provides a binary bit used by the addressed controller for establishing the polarity of the command voltage to turn ON and OFF the addressed control element. Circuit within the addressed controller provide current signals indicative of the status of the commanded element.

5 Claims, 7 Drawing Sheets

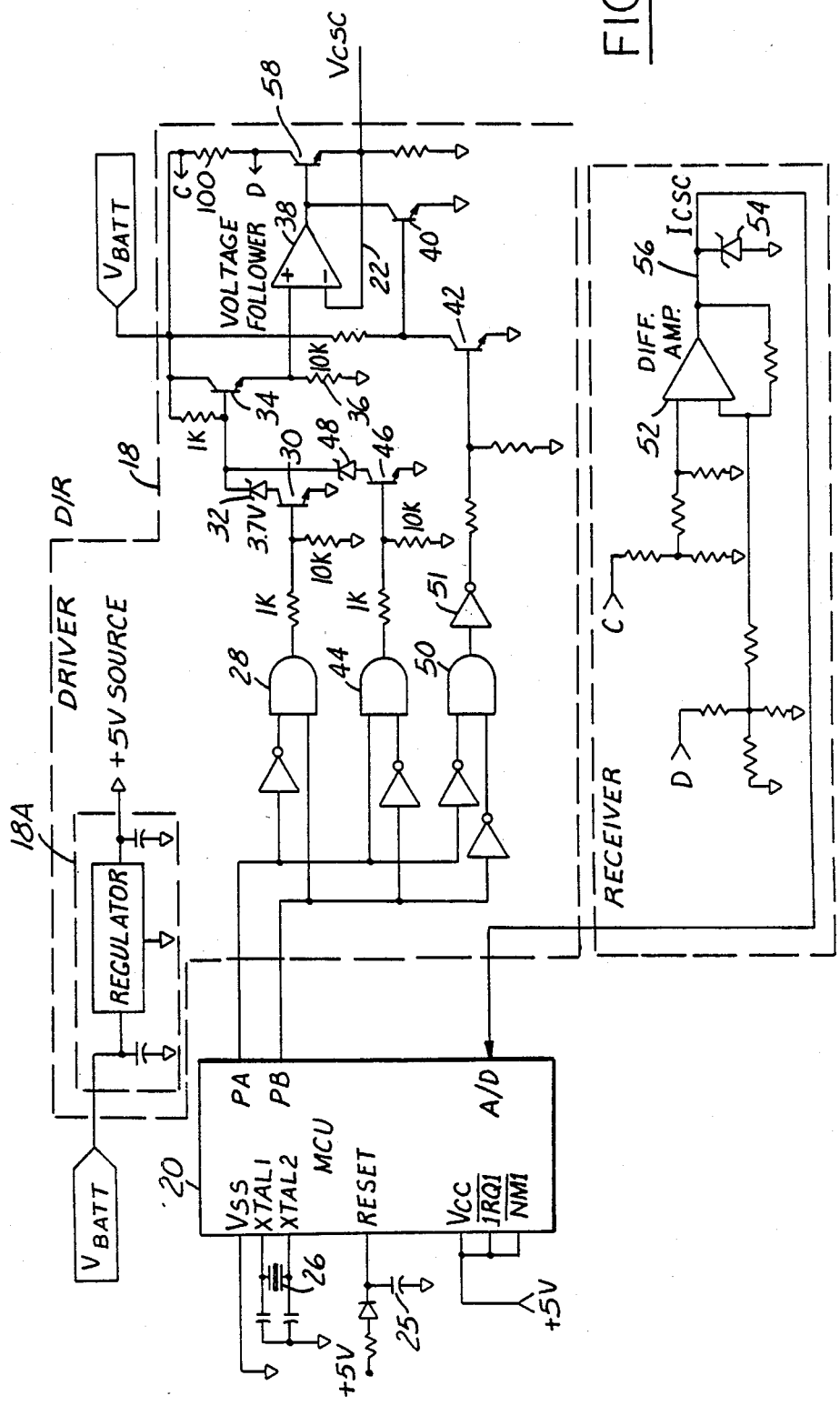

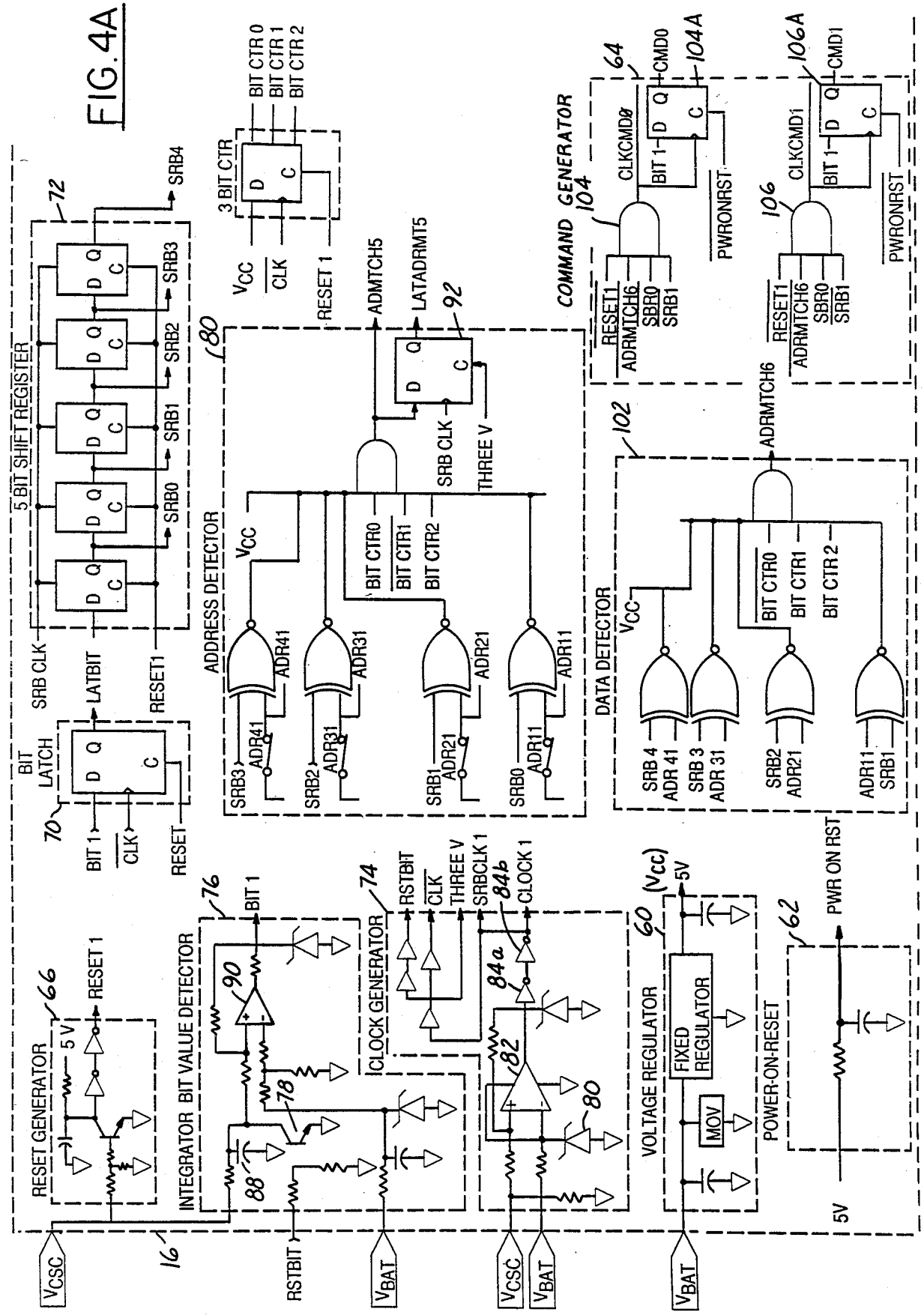

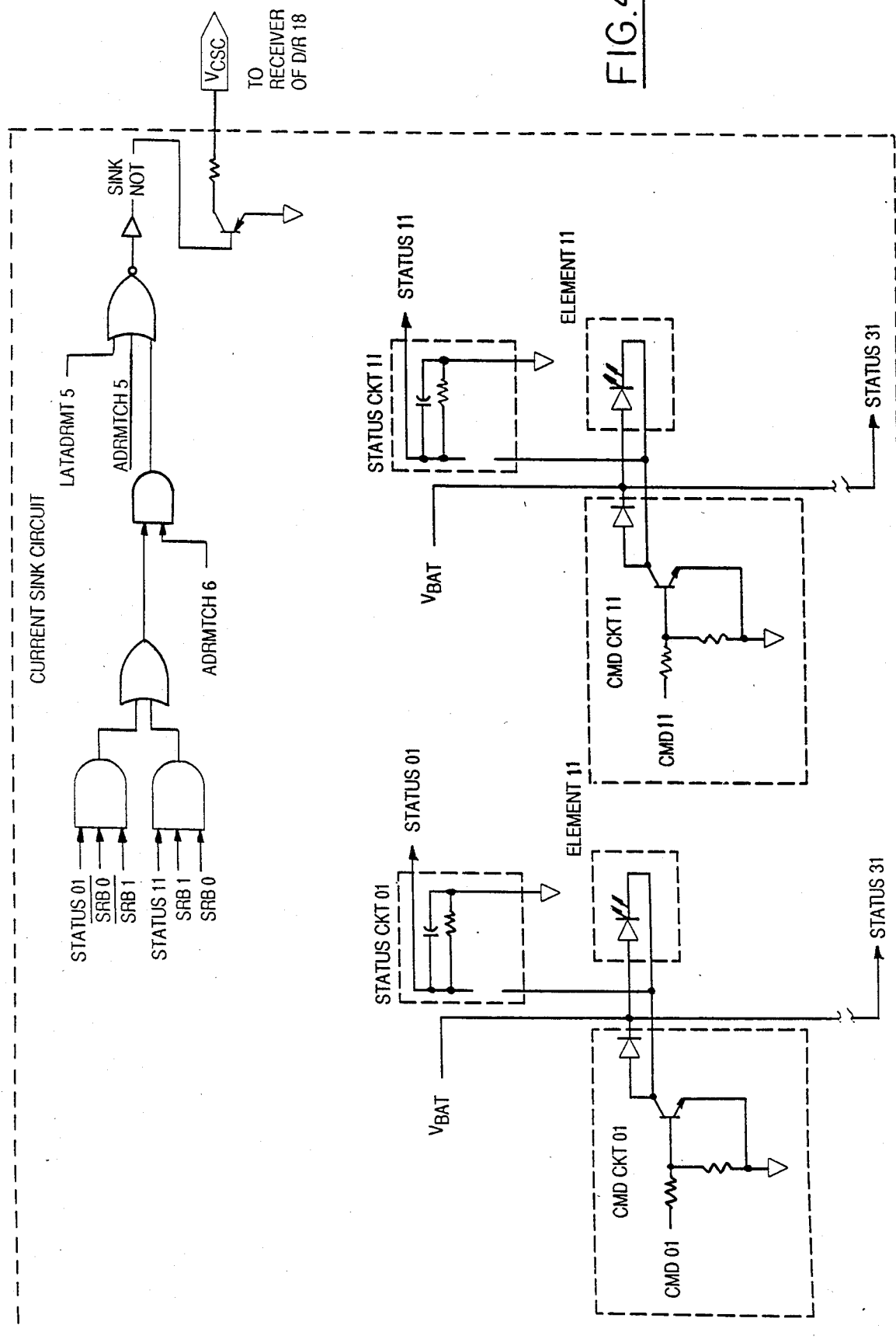

ELECTRICAL DEVICES COMMAND SYSTEM, SINGLE WIRE BUS AND SMART DUAL CONTROLLER ARRANGEMENT THEREFOR

BACKGROUND OF THE INVENTION

1. Field of the Invention

This invention relates to multiplexing techniques for controlling operation and obtaining status, over a single wire bus, of a plurality of electrical devices disposed throughout a motor vehicle and more particularly, in a preferred embodiment to systems for commanding the operation of a plurality of smart dual controllers each of which controls the operation and senses the status of a group of two electrical devices such as motors, lamps, relays, etc. disposed near the dual controller.

2. Description of the Prior Art

The present inventor and Frederick O. R. Miesterfeld in U.S. Pat. No. 4,736,367 entitled "Smart Control and Sensor Devices Single Wire Bus Multiplex System" which issued Apr. 5, 1988, taught using a plurality of smart control elements for controlling individual relay drivers that operate individual conventional mechanical relays to switch ON and OFF motors, other relays, lights, etc., and using a plurality of smart sensors to monitor the operation of a plurality of switches; i.e., whether the switches are open or closed. Also, that system provides diagnostic information concerning the smart control elements and smart sensors.

Each smart control element and each smart sensor connects at a separate single point on a single wire bus. A microcomputer and a driver/receiver circuit develops and places on the bus a particular offset square wave pulse train which provides power and control voltage signals to the plurality of smart control elements and smart sensors.

The smart control devices contain circuits that respond to the offset square wave pulse train in a manner that causes each smart control element to drive an associated relay driver after a chosen number of polling cycles dictated by address codes formed by various voltage levels of the pulse train. Conventional current signals are sent over the bus back to the driver/receiver circuit indicative of the status of the smart control device.

The smart sensors contain circuits that respond to the square wave pulse train in a manner that causes each smart sensor to send current signals back over the single wire bus to the driver/receiver circuit and then on to the microcomputer during designated repetitive and sequential time slots.

The driver/receiver circuit receives, interprets and converts the current signals from the smart control elements and the smart sensors into voltage signals used by the microcomputer for establishing a history of the status of the bus, the control elements, the sensors and the switches.

The microcomputer supplies continuous and updated information to a display system indicative of the status of each control element and each sensor and its associated switch.

This system requires wave train signals to poll and address the same control element several times before the associated relay driver circuit operates the relay. This polling scheme obviously consumes added time to effect the operation of the end device.

SUMMARY OF THE INVENTION

The instant invention comprises a multiplex system for addressing, commanding and monitoring the status of a plurality of electrical devices disposed throughout a motor vehicle. Each smart dual controller turns ON or OFF individually two devices such as motors, relays and lamps mounted at remote locations.

Each one of the dual controllers connects at a single point along a bi-directional, single-wire bus for receiving and interpreting address and command signals sent over the bus by a driver and receiver circuit (D/R). The D/R receives preprogrammed binary signals from a microcomputer containing address and commands information for operating the designated electrical device and then sends this information over the bus in the form of a series of, illustratively, six pulses of a dual-duty cycle format to the smart dual controllers.

The smart controllers convert the four most significant bits of the six pulses into a four-bit address code for addressing one of the two controllers and converts the least significant address bit into a command code for selecting one of the two electrical devices connected to each controller and a one-bit polarity code for controlling whether to turn ON or OFF the electrical device. The four-bit address code operates after the controller receives the first five pulses. If a match exists between the first four-bit code and a four-bit preprogrammed address of the controller, that particular controller is enabled. To acknowledge the enablement, that particular controller sends a current signal over the bus to the D/R which, in turn, converts the current signal into a voltage signal that routes to an A/D converter within the microcomputer.

The microcomputer then sends back to that particular controller, via the same route, the one-bit polarity code, the sixth pulse, which determines whether to command ON or OFF that electrical device.

The smart controllers contains circuits for detecting the status of the commanded electrical device and then sending a status indication in the form of a current signal back over the bus to the D/R. The D/R, in turn, transfers the status information as a voltage signal to the A/D converter circuit self-contained in the microcomputer. The microcomputer reads the output of the A/D converter and conveys the status information to a display unit which provides visual status information about the commanded electrical device.

BRIEF DESCRIPTION OF THE DRAWING

FIG. 2 depicts the five-state bus voltage signal illustrative of an address and a data message transmitted to the smart dual controllers;

FIG. 2a depicts the conversion of the five-state bus voltage signal into the logic 1 and logic 0 signals;

FIG. 3 shows a schematic diagram illustrative of a driver/receiver circuit connected between th single wire bus and the microcomputer;

FIG. 4A illustrates a schematic diagram of circuits in the dual controller for receiving address and data messages and for developing commands from the messages for commanding the electrical devices;

FIG. 4B shows a continuation of the schematic diagram of the circuits of the dual controller that use the data messages to provide status information regarding commanded electrical device;

DETAILED DESCRIPTION OF A PREFERRED EMBODIMENT

Figure 1:
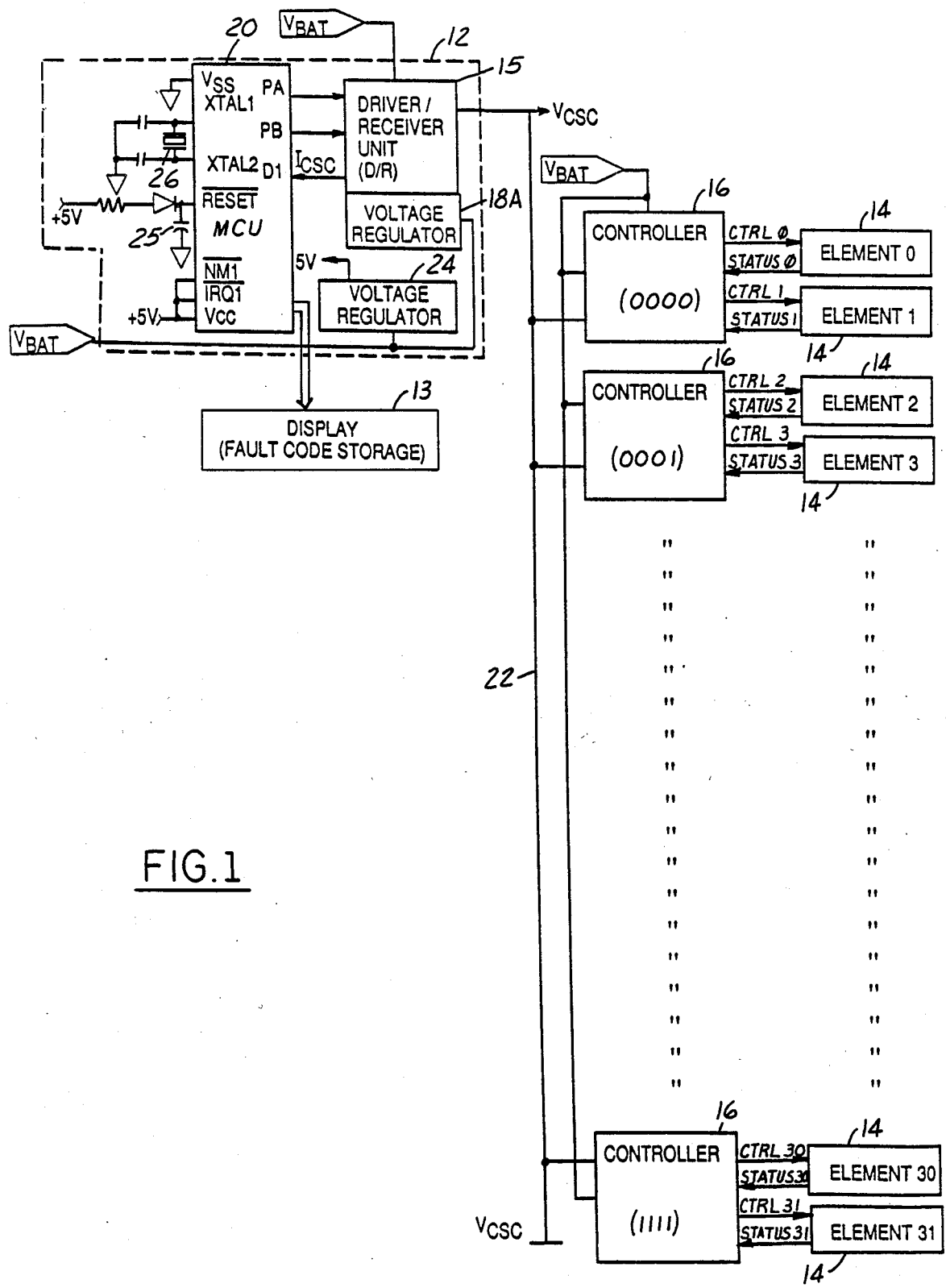
FIG. 1 depicts a partial block, partial schematic diagram of a command operated smart dual controller, single wire bus multiplex system.

Referring now to FIG. 1, this FIG. 1 illustrates a partial block, partial schematic diagram of a preferred embodiment of an electrical device command system, single-wire bus and smart dual controller arrangement 10. With +12 volts DC battery supply voltage ($V_{BAT}$) applied to the instrument compartment of a motor vehicle incorporating system 10, commands can place each electrical device ON or OFF and the commanded device can provide a status indication. Generally, the negative input of the battery voltage provides a circuit ground or a 0 volt potential. System 10 as shown in FIG. 1 includes a microcomputer (MCU) 20, a driver/receiver unit (D/R) 18, a single wire bus 22, sixteen controllers 16—16 and at least two devices or elements 14—14 per controller 16.

DRIVER/RECEIVER UNIT

In order to address the electrical devices 14—14, located at various remote locations of the motor vehicle, MCU 20 sends command signals to D/R 18. The instrument compartment 12 houses both the D/R 18 and MCU 20. Voltage from the 12 volt automobile battery supplies 12 V power to 12 V circuits of a 5 volt regulator circuit 18A associated with D/R 18 and to another 5 volt regulator circuit 24. Regulator 24 generates a precise output voltage (e.g., 5 VDC±5%) used by MCU 20. Regulator 24 also provides, after an externally programmed delay, a 5 VDC signal for resetting MCU 20 during a POWER-ON phase. The 5 VDC signal supplied to a NOT RESET terminal of MCU 20 provides a delayed signal allowing D/R 18 to get ready for MCU 20 commands. Capacitor 25 provides the external programmed delay function, holding the output voltage of regulator 24 LOW for a fraction of time (e.g., 20 ms) delaying start-up of MCU 20. After the delay, the NOT RESET signal goes HIGH and MCU 20 starts executing a factory installed program (the main software program) stored in a ROM (not shown) of MCU 20.

MCU 20, illustratively, a single chip 8 bit unit such as a Motorola MC68705S3 microcomputer chip contains a CPU, an on-chip clock, a ROM, a RAM, an input/output circuit (I/O) an analog to digital converter (A/D) and a timer. An external oscillator 26 controls the on-chip clock.

MCU 20 generates logic signals at ports A and B which route to D/R 18 for developing a bus undulatory voltage square-wave $V_{csc}$ signal over bus 22 similar to that shown in FIG. 2. D/R 18 contains circuits responsive to logic signals from MCU 20 which develop voltage levels used to create $V_{csc}$. The logic signals from port A and port B of MCU 20 selectively employ logic circuits in D/R 18 to develop 25 percent and 75 percent duty cycle pulses that represent LOW and HIGH signals respectively.

D/R 18 includes driver circuits for driving the $V_{csc}$ over the single wire bus 22. The $V_{csc}$ signal contains address information and command information in a preferred embodiment for each of 16 controllers 16—16 connected to bus 22. The $V_{csc}$ signal can provide illustratively five address bits and a command bit message for each of the 16 controllers. A reset bit separates each message sent over bus 22.

Each controller 16 connects to bus 22 by a single wire. The output for each controller has two (2) output command lines with one line going to each of the two electrical devices associated with the controller; and two (2) status lines coming from the two devices to two input ports on each controller. An address code (e.g., 0000;0001; 0010, etc.) for each controller is preprogrammed by a hard-wire code or individual switches.

After initialization of registers and memories in MCU 20, and in accordance with the main program, code signals from port A and B of MCU 20 generate the $V_{csc}$ signals for commanding the controllers 16—16 connected to bus 22.

With reference now to FIGS. 2, 2A and 3, as noted in FIG. 2, the $V_{csc}$ signal comprises five states, mainly an off-state or zero volt, a reset ($V_{RST}$) state illustratively 2.5 volts, a three-volt state, a threshold-voltage ($V_{THR}$) state of approximately 4.5 volts and a six-volt state. To generate these various states, the logic circuitry in D/R 18 of FIG. 3 produces several levels of voltage signals. The reset state occurs during transitions from zero-volt to the three-volt state or vice-versa; the threshold state results during the transitions from the three-volt to the six-volt state as well as the transition from the six-volt to the three-volt state.

As shown in FIG. 3, to generate the three-volt state, AND gate 28 must receive a LOW signal from port A of MCU 20, and a HIGH signal from port B. When gate 28 turns ON, a base voltage of about 0.6 volt turns ON transistor 30. When transistor 30 turns ON, NPN transistor 34 receives a base voltage of about 3.7 volts. A 3.7 volt-zener diode 32 connected in the collector path of transistor 30 limits the base voltage of transistor 34. With the 3.7 volts base voltage applied to transistor 34, an emitter voltage of approximately 3.1 volts, enters the non-inverting input of voltage follower 38 limited by input resistor 36. Voltage follower 38 produces an output voltage of about 3.8 volts which is approximately 0.7 volt above the input voltage. When NPN transistor 58 turns ON in response to the output voltage from voltage follower 38, an emitter voltage of about 3-volts appears on bus 22.

To generate the six-volt state, AND gate 44 turns ON when programmed by MCU 20 with a HIGH signal from port A and a LOW signal from port B. With gate 44 ON, a base voltage of approximately 0.6 volts turns transistor 46 ON. When transistor 46 turns ON, NPN transistor 34 turns ON as a result of a base voltage of approximately 6.7-volts regulated by zener diode 48. The emitter voltage from transistor 34 applies about six-volts to the non-inverting input terminal of voltage follower 38 producing an output volt of about 6.7 volts. Bus 22 connected to the emitter of transistor 58 receives a voltage signal of six-volts.

To generate the OFF-state or zero-volt, AND gate 50 must receive a LOW signal from ports A and B of MCU 20. The output of inverter 51, connected at the output of AND gate 50, goes LOW to turn ON NPN transistor 42. When transistor 42 turns ON, NPN transistor 40 also turns ON placing the output of voltage follower 38 at a voltage less than 0.6 volt causing transistor 58 to remain OFF. With transistor 58 turned OFF, the OFF-state or zero-volt is established for bus 22.

As mentioned supra, the reset state is established during the transition from zero volt to the three-volt state. And the address messages occur during transitions between the three-volts and six-volts state. Also note, that the address bits occur during the three to six volt transition. The LOW bits are the 25 percent duty cycle pulses or 250 microseconds duration and the HIGH bits are 75 percent duty cycle pulses or 750 microseconds duration.

FIG. 2A illustrates the saw-tooth waveform generated by controller 16 after integrating the square-wave $V_{csc}$ signal.

The receiver portion of D/R 18 will be discussed infra.

SINGLE WIRE BUS

As mentioned, supra, bus 22, a bi-directional single wire communication assembly, permits transmitting address and command information to each controller 16—16 connected to the bus and current signals or status information from the controllers back to D/R 18. This single wire assembly, a flexible length of wire of a suitable gauge covered with an insulated material at all points except for the controller interface regions, routes in the vicinity of all the controllers.

ELECTRICAL DEVICES

The electrical devices or elements, as shown in FIG. 1, controlled and monitored by system 10 include lamps, motors, relays, etc. The outputs from controller 16 sources about 10 mA at about 10 volts (with a supply voltage of 12 volts). The status input lines to controller 16 from the electrical devices sink about one mA of current.

SMART DUAL CONTROLLER CIRCUIT

Referring now to FIGS. 4A and 4B, a partial-block, partial-schematic diagram depicts a smart dual controller 16 including the various controller subsections. Each controller 16 sends commands to the electrical devices 14, receives status messages from the devices, and then transmit status messages to D/R 18. The 12 volt battery supplies power to controller 16. Several circuits in controller 16 utilize the battery voltage including a voltage regulator 60 which produces a fixed and regulated approximately 5 VDC for powering controller 16. Regulator 60 supplies power to all the logic circuits of controller 16 and initiates a POWER-ON-RESET signal from a POWER-ON-RESET circuit 62. This POWER-ON-RESET signal resets the flip-flops in the command generator circuit 64 used to provide commands to the electrical devices 14.

Bus 22 brings the $V_{csc}$ signal to the various circuits of controller 16 requiring the $V_{csc}$ signal. A RESET generator 66 uses the zero to three-volt transition or the three-to-zero-volt transition of $V_{csc}$ to generate a RESET 1 signal used to reset a three-bit counter 68, a bit latch 70, and a five-bit shift register 72

Clock generator 74 uses the $V_{csc}$ and the battery voltage to generate five different clock signals, namely RSTBIT, NOT CLK, THREEV clock, SRBCLK-1 and CLOCK-1. The RSTBIT clock signal resets an integrator and bit value detector 76 after the detection of each bit from $V_{csc}$. The NOT CLK signal clocks a series of BIT-1's into the bit latch 70 after the bits are detected by the integrator and bit value detector circuit 76. The THREEV clock resets a LATADRMT 5 latch in an address detector circuit 80 after the detection of an address. The NOT CLOCK-1 signal clocks a five-volt $V_{cc}$ signal into the three bit counter 68. The SRBCLK-1 signal clocks bits from bit latch 70 through the five-bit shift register 72. The CLOCK-1 signal goes to selected logic gates used to generate the previously mentioned four clock signals. Clock generator circuit 74 generates the CLOCK 1 signal by having the battery voltage limited by a zener diode 81 to approximately 4.7-volts. This voltage provides a reference voltage at the inverting terminal of comparator 82, while the non-inverting terminal of comparator 82 follows the transitions of the $V_{csc}$ between the three and six-volt states. Comparator 82 provides a HIGH signal when $V_{csc}$ passes through, illustratively, the threshold voltage of about 4.7-volts up to the six-volt state and remains HIGH until the $V_{csc}$ goes from the six-volt state towards the three-volt state on the trailing edge of $V_{csc}$. A pair of HEX-SCHMITT TRIGGER INVERTERS 84, not required except when this system is implemented in programable logic arrays used in a programmable logic device (PLD) embodiment of system 10, sharpens the clock edges of the CLOCK-1 signal during clock transitions with the first inverter 84A inverting the output voltage from comparator 82 to LOW and the second inverter 84B inverting the output of inverter 84A to HIGH or five-volts. The output from inverter 84B, the CLOCK-1 signal, generates the SRBCLK-1 signal directly, the RSTBIT clock signal, THREEV, and the NOT CLK signals indirectly through an inverter 86.

BIT VALUE DETECTION

Integrator and bit value detector circuit 76 receives $V_{csc}$ as an input to an integrator circuit 88 and receives a RSTBIT clock signal as an input to a base-bias circuit of transistor 78. As mentioned supra, $V_{csc}$ varies between voltage states ranging from 0-volt through a reset voltage of around 2.5-volts through the 3-volt state and up to a voltage threshold state of around 4.7-volts to the six-volt state. MCU 20 of FIG. 3 causes the bus voltage to generate duty cycles signals between three-volts and six-volts. When transmitting address bits over bus 22 as mentioned supra, a 25 percent duty cycle pulse represents a LOW signal and a 75 percent duty cycle pulse represents a HIGH signal. The integrator 88 of FIG. 4A in circuit 76 responds to the three to six-volt transitions for both type duty cycle pulses. The capacitor in the integrator circuit 88 starts charging during the three-to-six-volt transition of $V_{csc}$ and continues charging for as long as the voltage is at 6 volts above the 4.7 volt threshold. If a 25 percent duty cycle pulse or LOW signal is provided as the $V_{csc}$ signal, the charging period of the capacitor in integrator 88 is reduced. If a 75 percent duty cycle or HIGH signal is provided as the $V_{csc}$ signal, the charging time of the capacitor of circuit 88 is expanded for a period three times that used for establishing the LOW signal. When forming the LOW signals, the integrator capacitor charges up to a voltage below the reference voltage applied to the inverting input comparator 90. This reference voltage is approximately 1.8 volts, when forming the LOW signals. The LOW signal is read as a LOW BIT 1 output signal from comparator 90. When forming the HIGH signals, the capacitor of integrator 88 charges to about three-volts causing the non-inverting input of comparator 90 to exceed the reference voltage applied to the inverting input. Comparator 90 issues a HIGH BIT 1 signal when the capacitor of integrator 88 exceeds the reference voltage. Once the HIGH or LOW BIT 1 forms, and $V_{csc}$ returns to the three-volt state, the BIT 1 signal is latched into bit latch 70 and the RSTBIT clock signal resets circuit 76 by causing a base-bias voltage which turns ON transistor 78 grounding the integrator 88 at the input to the inverting input of comparator 90.

CONTROLLER ADDRESS MATCHING

After each BIT 1 is generated, the NOT CLK signal clocks that bit into bit latch 70. As each bit is latched, three-bit counter 68 counts the number of times the NOT CLK signal is used for latching the bits into bit latch 70. The NOT CLK signal appears on the trailing edge of the six to three-volt transition of the bus voltage signal.

Prior to latching the next bit into bit latch 70, the previous bit is transferred to the five-bit, shift register 72 and is called a LATBIT Signal. The SRBCLK signal clocks each LATBIT signal through register 72.

After the three bit counter 68 counts to five, the four least significant bits in the first, second, third, and fourth registers of register 72 (SRAB0, SRB1, SRB2 AND SRB3) are compared with the four preprogrammed addressed bits ADR11, ADR21, ADR31, and ADR41, in address detector 80. If an address match occurs when the 3 BIT CTR 68 counts to five (BIT CTR0, NOT BIT CTR1 AND BIT CTR 2), a ADMTCH 5 signal is latched in latch 92 when the next SRBCLK 1 signal occurs.

RECEIVER PORTION OF D/R UNIT-CONTROLLER ACKNOWLEDGEMENT

The LATADRMT5 signal produces a SINK NOT signal from the output of AND gate 96 of FIG. 4B which turns ON transistor 98 grounding bus 22 through a resistor at the controller end. The voltage difference across point C and D of resistor 100 of driver 18 of FIG. 3 increases causing difference amplifier 52 to produce an increased voltage signal on line 56 representing the current signal $I_{csc}$, which routes to the A to D converter input of MCU 20. This current signal to MCU 20 is an acknowledgment that the controller 16 is listening and recognizes its address. If MCU 20 does not detect that the controller is listening, it puts bus 22 into RESET and tries again without transmitting the data bit.

DATA DETECTING

After the acknowledgement that controller 16 is listening, MCU 20 sends the sixth bit or data bit. The previous BIT 1 latched in bit latch 70 shifts into the 5-bit shift register 72 filling register 72 and providing the four bits (SRB1-SRB4) needed to generate an ADRMTCH 6 signal and the bit (SRB0 of the proper polarity) needed to select which one of the two electrical devices MCU 20 desires to command. The sixth bit, in the form of BIT 1, routes directly to the latch of command generator 64 to cause the desired command signal (CMD) to go either HIGH or LOW in response to the polarity of BIT 1.

COMMANDING THE ELECTRICAL DEVICES OR ELEMENTS

Each dual controller may command two different electrical devices using CMD0-CMD1 signals.

If MCU 20 desires to command ON element 0, the CMD0 signal turns ON a CMD CKT 0 circuit 120 which activates element 0. When control element 0 activates, a STATUS 0 signal from circuit 104C routes to AND gate 104D of the current sink circuit 94. The status CKT 01 signal is added to the two-least significant bits of register 72 of FIG. 4A at AND gate 104D of FIG. 4B and then further added with the ADRMTCH 6 signal at AND gate 132 to produce a SINKNOT signal from NOR gate 96. The SINKNOT signal turns ON PNP transistor 98, connecting a resistor from $V_{csc}$ voltage bus 22 to ground, raising the amount of current flowing through bus 22. When more current goes through bus 22, the current through resistor 100 of FIG. 3 increases the signal from the difference amplifier 52 in the receiver sends a voltage signal representing current $I_{csc}$ back to the A/D of MCU 20 to provide a status signal to the computer. This response occurs if the status line corresponding to CMD0 is a logic 1.

If the status line is LOW, the associated controller will either inhibit the current sink circuit from not sending a status signal back to D/R 18 or it will turn OFF the current sink circuit.

The status line still reads its status to D/R 18 by turning on the current sink circuit transistor NPN 98 if the status line corresponding to CMD0 is HIGH, the same way the status line responds if the data bit is HIGH.

This sequence of events occur for each electrical device that is commanded.

FLOW CHART

Figure 5A:
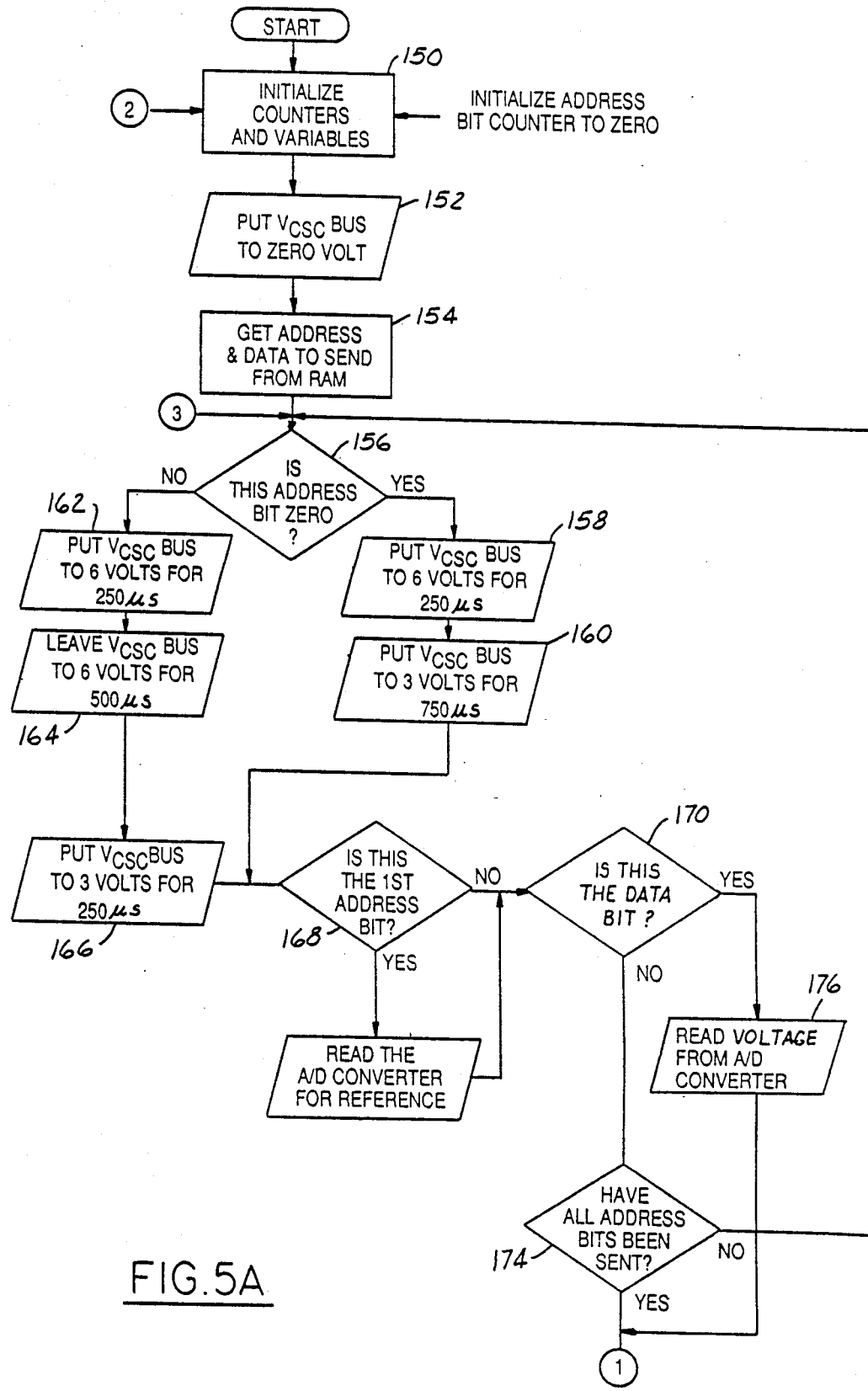
FIGS. 5A and 5B illustrates a flow diagram of the operation of the system.
Figure 5B:
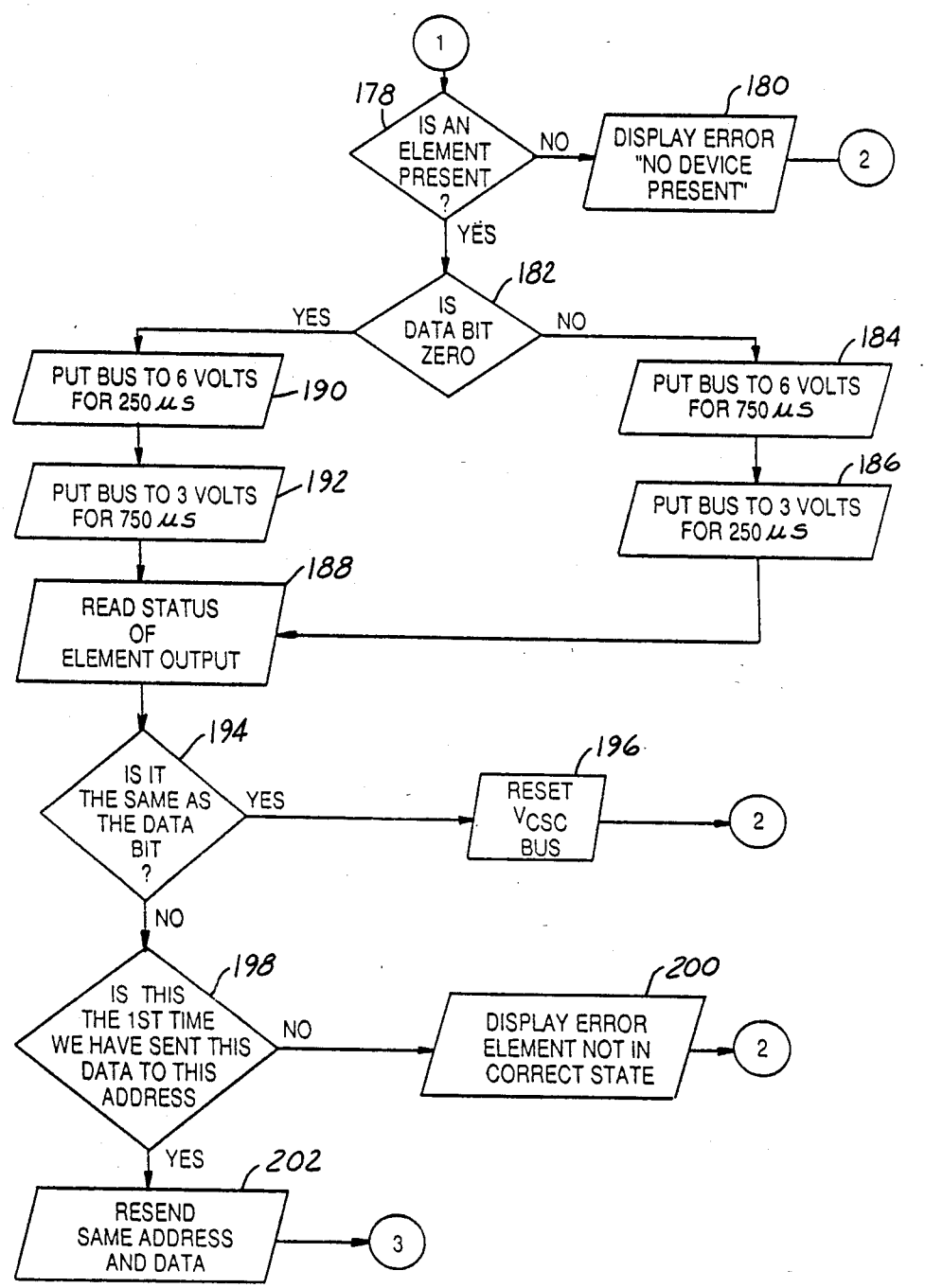

With reference now to FIGS. 5A and 5B, there, a flow chart depicts the program executed by MCU 20. After START UP of the program and after the 20 ms power ON delay, as indicated in processing-function block 150, MCU 20 executes a small start-up program which sets all CPU registers with correct values and clears all information presently in memory before accepting information from D/R 18. MCU 20 also initializes the counters in RAM and the stored variables. Counters, such as the three-bit counter 68, is set to 0. The desired addresses to be sent over the bus to D/R 18 are stored in memory and all initial conditions are met.

In this embodiment, the stored information, illustratively, includes the sequence for addressing 16 controllers and for addressing 16 groups of two devices or elements. As can be appreciated by those skilled in the art, MCU 20 operates in the MHz range, while system 10 operates around the one KHz range. Hence, MCU 20 can perform many tasks before system 10 reacts. As indicated in output-operation block 152, the program tells MCU 20 to put the $V_{csc}$ bus to 0 volt. In performing this instruction, MCU 20 writes to ports A and B in a manner providing to the inputs of AND gate 50 of D/R 18 of FIG. 3 a LOW signal in order to initiate and to establish the OFF-state of square wave forming $V_{csc}$ of FIG. 2A.

MCU 20 performs output operations by writing the appropriate logic level signals to ports A and B which, in turn, controls the output levels placed on bus 22 by D/R 18.

With the $V_{csc}$ bus at 0 volt, the addresses and data sent over the bus come from RAM. Therefore, MCU 20 receives, as in processing-function block 154, the instruction to get the addresses and data from RAM. MCU 20 sends a serial stream message of five address bits and a data bit to D/R 18 for transmission over bus 22 for commanding each electrical device.

MCU 20 looks at the first address bit and determines whether or not the bit is zero as indicated in decision block 156. If the bit is zero, MCU 20 will do the operations specified by the YES branch. Otherwise, it will perform the operations along the NO branch. Assuming the YES branch is taken, MCU 20 receives the instruction in output-operation block 158 and executes that instruction by writing to port A and B to put the $V_{csc}$ bus at 6 volts for 250 microseconds. Then MCU 20 executes the instruction in the output-operation box 160 of placing the $V_{csc}$ to 3 volts for 750 microseconds. These two successive operations form the 25 percent duty cycle pulse used by D/R 18 to form the zero address bit. If the NO branch is followed, MCU 20 performs the sequential output operations specified in block 162, 164 and 166 which causes the $V_{csc}$ bus to go to 6 volts for 250 microseconds, as in block 162; to leave the bus at 6 volts for 500 microseconds, as in block 164; and then put the bus at 3 volts for 250 microseconds, as in block 166. These operations form the 75 percent duty cycle pulse used to form the HIGH bit signal in D/R 18.

When the polarity of the bit has been established, MCU 20 checks to see, as in decision block 168, if the present bit is the first address bit. If this bit is the first address bit, MCU 20 executes the instruction in the input operation block 172 in the YES branch requiring the reading of the A/D converter for a reference voltage, then proceeding to decision block 170 requiring checking to see if the bit is the data bit. Obviously, the bit is not the data or last bit because, in accordance with the NO branch, it is the first address bit; therefore, MCU 20 checks to see if all the address bits have been sent as instructed in decision block 174. Obviously, since this is the first bit, all the address bits have not been sent, so MCU 20 takes the NO branch back to decision block 156 in order to obtain the other address bits.

When MCU 20 reads the A/D converter for the referenced or quiescent current, which is equal to approximately 2.5 mA times the number of electrical devices or elements and, if there are 32 elements, then the reference current will be 80.0 milliamps. This reference current value is stored in memory as a reference voltage for later use.

If this present bit is not the first address bit, then MCU 20 takes the NO branch to decision block 170 and determines whether or not this is the data bit. If it is, then MCU 20 takes the YES branch, otherwise, it takes the NO branch to decision block 174. If this is the data bit, MCU 20 executes the instruction in the input-operation block 176 which calls for reading the input voltage from the A/D converter. MCU 20 compares this new value of voltage in block 178 with the stored reference voltage or quiescent value to determine if a controller is present. If one controller is present, the second reading will approximate current 15 mA above the quiescent value.

If no controllers are present, then the NO branch is taken to the output-operation block 180 which instructs MCU 20 to send to the display unit signals which causes the unit to display the error and to indicate that the controller is not present, and then proceed to reinitialize MCU 20 as instructed in block 150. If the YES branch is taken, then MCU 20 checks the sixth bit which is really the data bit to see if it is zero as in decision block 182. If the NO branch is taken, then MCU 20 executes instructions in output-operation blocks 184 and 186 to create a 75 percent duty cycle pulse representing a HIGH data bit. Then MCU 20 proceeds to input-operational block 188 and reads the status of the element via the output of the A to D converter. If the data bit is zero, then MCU 20 takes the YES branch of decision block 182 and proceeds to execute instructions in output-operation blocks 190, 192 and 188. The instructions in output-operational blocks 190 and 192 cause MCU 20 to write a 25 percent duty cycle pulse on the bus for 250 microseconds. Then MCU 20 proceeds to input-operational block 188 and reads the status of the elements via the output of the A/D converter. As in decision block 294, if the expected status indication is obtained, then the YES branch is taken to output-operational block 196 where the instruction to reset the $V_{csc}$ bus is performed. Then, MCU 20 proceeds to the processing-function block 150.

MCU 20 then checks to see if this is the first time this data has been sent to this address in accordance with decision block 198. If not, then the NO branch is taken to the output-operation block 200 which instructs MCU 20 to display the error message that the element is not in the correct state. Then MCU 20 is instructed to proceed to processing-function block 150. If the YES branch is taken, then MCU 20 follows the instruction in output-operational block 202 and resends the same data to the same address and then enters the loop at decision block 156.

Figure 6:
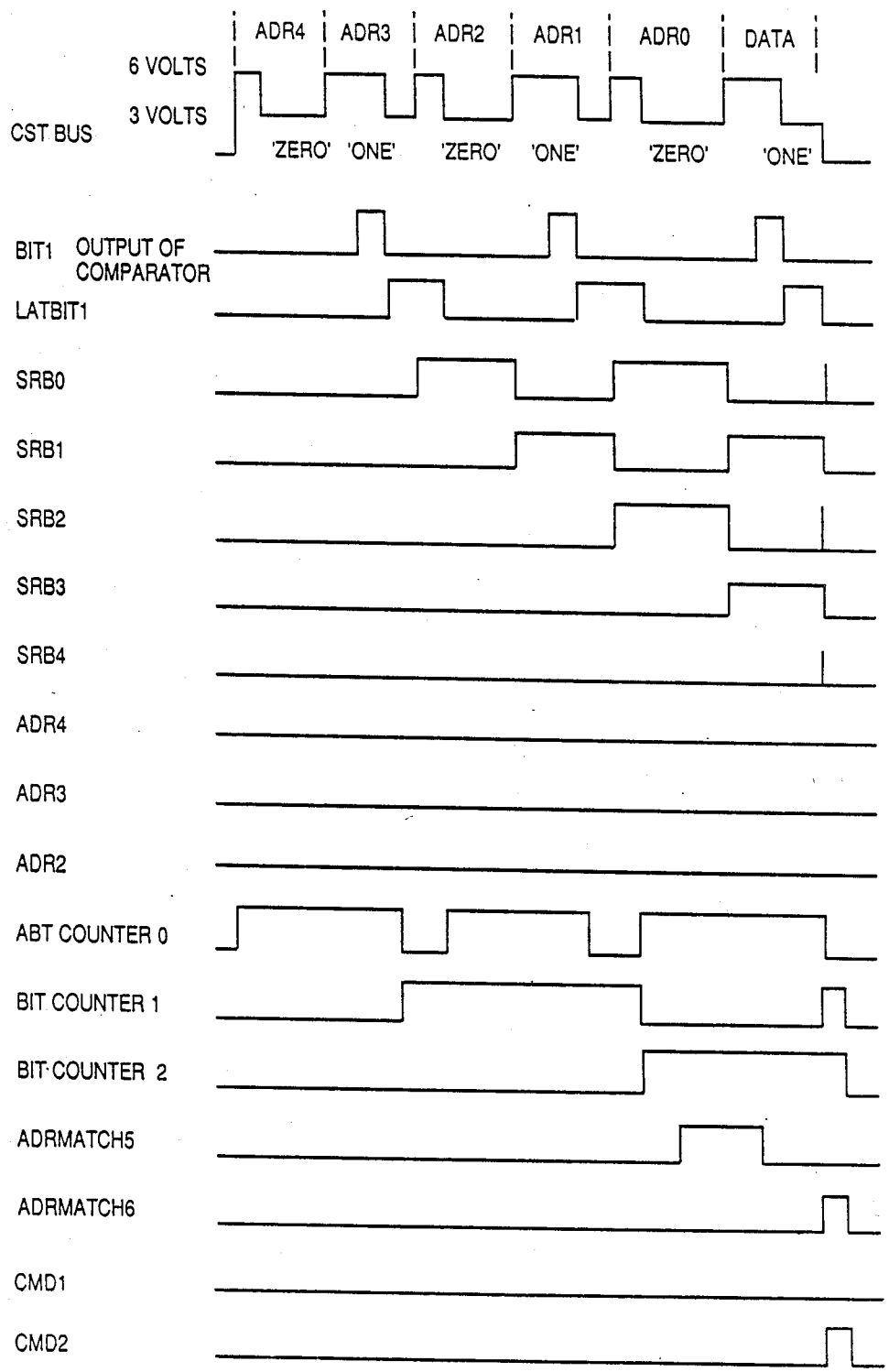
FIG. 6 depicts the timing sequence for commanding the electrical device.

FIG. 6 provides timing diagrams depicting signals used to command ON electrical devices. Note that four address bits enable the controller and one bit is used to select the electrical device. Also, note that upon $V_{csc}$ returning to below three volts, the gates and registers of system 10 are RESET.

I claim:

1. A multiplex system within a motor vehicle for commanding and monitoring the status of a plurality of electrical devices or elements disposed throughout the motor vehicle, each of the elements having command terminals for receiving commands in the form of a discrete voltage signal for activating or deactivating each of the elements, one of the command terminals also being used to provide a status indication of each of the elements in the form of a current signal upon being commanded, said system comprising:

(a) a bi-directional, single wire bus for transmitting in a first direction a series of square wave, double duty cycle, voltage signals used for commanding ON or OFF the plurality of elements and a series of current signals transmitted in a second direction used for indicating the ON and OFF status of the plurality of elements;

(b) a plurality of smart dual controllers disposed throughout the motor vehicle, each one of said dual controllers being disposed near a pair of elements for commanding ON or OFF one of the pair of elements, each of said dual controllers having:

(1) a single input/output terminal connected by a single wire to a single point along said bus for receiving the square-wave voltage signals from said bus and;

(2) integration means for converting the square-wave voltage signal into a dual-amplitude, sawtooth-pulse waveform containing address and data information wherein a first amplitude pulse represents LOW bits and a second amplitude pulse represents HIGH bits;

(3) detection means for detecting a first portion of an address code from said sawtooth-pulse waveform in order to enable said dual controller to command one of the pair of elements when the detected address code matches a preprogrammed address of said dual controller, said detection means also including means for detecting a second portion of the address code used for selecting which one of the pair elements to command ON or OFF;

(4) means for detecting a data bit code from said sawtooth pulse waveform in order to determine whether to turn ON or OFF the selected element;

(5) means for commanding the selected element ON or OFF, said commanding means including means for transmitting a current signal back over said bus indicative of the status of the element after commanding the element ON or OFF;

(c) a driver and receiver means, receiving power from a power source of the vehicle and connected to said single-wire bus, for generating the series of square-wave, double-duty cycle voltage signals used by each of said dual controllers, said driver and receiver means also including means for receiving the status of the elements indicating current signals transmitted over said bus;

(d) display means for displaying the status of the plurality of elements; and (e) a microcomputer means interconnecting said driver and receiver means and said display means for (1) writing logic commands to said driver and receiver means for controlling the generating of the series of square-wave, double-duty cycle voltage signals used for placing address and command information on said bus, (2) reading the current signals indicative of the status of the commanded element; (3) establishing a history of performance of each of the commanded elements; and (4) transferring updated status information to said display means.

2. Apparatus in accordance with claim 1 wherein each of the series of square-wave voltage signals contain five independent duty-cycle, address pulse signals and a data pulse signal, four of the address pulses being used to address one of said dual controllers by matching the predetermined address fixedly assigned to each controller and the fifth address pulse being used to enable an addressed dual controller to command ON or OFF, with a voltage signal, one of the pair of elements and the data pulse being used to determine the polarity of the command voltage signal going to the addressed element.

3. Apparatus in accordance with claim 2 wherein said dual controller includes (1) means for converting said address and command pulses into address and command binary bits, (2) means for detecting said address and data bits, (3) means for providing an acknowledgement to said microcomputer of the addressing of said dual controller, (4) means for commanding one of the pair of elements ON or OFF in response to the polarity of the detected data bit, and (5) means for detecting a status indicating current signal from the commanded element and then transmitting the current signal over said bus to said driver and receiver means.

4. In a vehicle multiplex system for both controlling and monitoring the status of a plurality of electrical devices or elements disposed throughout the motor vehicle, the elements containing control and status indication terminals, the system comprising:

a. microcomputer means having a predetermined program which controls addressing, commanding and monitoring the system and which produces therefrom a series of logic signals from at least a pair of output ports that represent the address and command information needed for operating the plurality of elements;

b. driver and receiver means adapted to receive the series of logic signals from said microcomputer means and to selectively convert the series of input logic signals into a series of dual-duty cycle output voltage signals of a chosen format containing address and data information needed to operate the plurality of elements;

c. a bi-directional, single wire bus connected to the driver and receiver means at one end for transmitting the voltage signals in a first direction needed to operate each of the plurality of elements and for transmitting status information concerning the operated element after the element had been operated in the form of a current signal from the element in a second direction, said bus being routed throughout the vehicle, and d. a plurality of dual controllers, each of which having connections from an output end to a pair of the plurality of elements so as to permit commanding ON or OFF the connected pair of elements and to permit obtaining a current signal from the connected elements indicative of the operational status, each of said plurality of controllers having means for (a) forming a single point input connection with said bus and for (b) forming a power connection across a vehicle battery to receive battery power.

5. Apparatus in accordance with claim 4 wherein said microcomputer means includes means for reading the status information of each commanded element transferred by each of said dual controllers, and wherein said microcomputer means also includes means for transferring the status information to said display means for display.

* * * * *